(12) United States Patent
Moon

(10) Patent No.: US 6,788,732 B2
(45) Date of Patent: Sep. 7, 2004

(54) INITIAL ACQUISITION AND FRAME SYNCHRONIZATION IN SPREAD SPECTRUM COMMUNICATION SYSTEM

(75) Inventor: Hi-Chan Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/227,496

(22) Filed: Aug. 21, 2002

(65) Prior Publication Data

US 2002/0191682 A1 Dec. 19, 2002

Related U.S. Application Data

(62) Division of application No. 09/358,300, filed on Jul. 21, 1999.

(30) Foreign Application Priority Data

Jul. 21, 1998 (KR) .......................................... 98-29344

(51) Int. Cl.⁷ ................................................ H04B 1/69
(52) U.S. Cl. ...................................................... 375/147
(58) Field of Search ................................ 375/130, 136, 375/142, 143, 147, 150, 152; 370/320, 335, 342, 441

(56) References Cited

U.S. PATENT DOCUMENTS 5,933,424 A     8/1999    Muto
5,953,326 A  *  9/1999    Nakamura et al. .......... 370/335
5,978,412 A     11/1999   Takai
5,978,413 A  *  11/1999   Bender ........................ 375/149
5,991,330 A  *  11/1999   Dahlman et al. ............ 375/149
6,072,802 A     6/2000    Uhm et al.
6,125,136 A  *  9/2000    Jones et al. .................. 375/147
6,137,786 A     10/2000   Ariyoshi et al.
6,347,220 B1 *  2/2002    Tanaka et al. ............ 455/277.2
6,356,555 B1 *  3/2002    Rakib et al. ................. 370/441
6,459,693 B1 *  10/2002   Park et al. ................... 370/342
6,480,472 B1 *  11/2002   Jou et al. ..................... 370/252
6,567,482 B1 *  5/2003    Popovic ...................... 375/343

* cited by examiner

Primary Examiner—Emmanuel Bayard
(74) Attorney, Agent, or Firm—Dilworth & Barrese LLP

(57) ABSTRACT

A device for rapidly performing initial acquisition and frame synchronization of a received signal for a receiver in a CDMA communication system. To this end, the base station multiplies a spreading sequence for a pilot channel by a synchronization pattern which maintains a pattern of inverting its sign in order to delineate the boundaries of the short sequence periods. A mobile station initially calculates the spreading sequence of the short period and the correlation value to perform initial acquisition, and despreads N-chip duration around a boundary of the one short spreading sequence period to detect the multiplied pattern, thereby acquiring synchronization of a data frame.

10 Claims, 10 Drawing Sheets

US 6,788,732 B2

INITIAL ACQUISITION AND FRAME SYNCHRONIZATION IN SPREAD SPECTRUM COMMUNICATION SYSTEM

This application is a Divisional of parent application Ser. No. 09/358,300, filed on Jul. 21, 1999.

PRIORITY

This application claims priority to an application entitled "Initial Acquisition and Frame Synchronization in Spread Spectrum Communication System" filed in the Korean Industrial Property Office on Jul. 21, 1998 and assigned Ser. No. 98-29344, the contents of which are hereby incorporated by reference.

BACKGROUND OF THE INVENTION

1. Field of the Invention

The present invention relates generally to a spread spectrum communication system, and, in particular, to a device and method for performing initial acquisition and frame synchronization using a spreading code for a mobile station.

2. Description of the Related Art

FIG. 1 illustrates an IS-95 forward link of a base station, for transmitting channel signals to a mobile station in a Code Division Multiple Access (CDMA) mobile communication system. As shown, in a CDMA mobile communication system, the forward link includes a pilot channel, a sync channel and a paging channel. Though not illustrated, the forward link further includes a traffic channel for transmitting the voice and data of a user.

Referring to FIG. 1, a pilot channel generator 110 generates a pilot signal comprised of all "1"s for a pilot channel, and a multiplier 114 multiplies the pilot signal by an orthogonal code $W_0$ to orthogonally spread the pilot signal. Here, a specific Walsh code is used for the orthogonal code $W_0$. A multiplier 115 multiplies the pilot channel signal output from the multiplier 114 by a PN (Pseudo Noise) sequence to spread the pilot channel signal.

With regard to the structure of a sync channel generator 120, a coding rate R=½, constraint length K=9 convolutional encoder can be used for an encoder 121. A repeater 122 repeats sync symbols output from the encoder 121 N times (N=2). An interleaver 123 interleaves the symbols output from the repeater 122 in order to prevent burst errors. A block interleaver is typically used for the interleaver 123. A multiplier 124 multiplies the sync channel signal by a specific orthogonal code assigned to the sync channel to orthogonally spread the sync channel signal. The sync channel outputs the positional information, standard time information and long code information of the base station, and also outputs information for system synchronization between the base station and a mobile station. As stated above, the sync channel generator 120 encodes an input sync channel signal, and multiplies the encoded sync channel signal by a specific Walsh code $W_{sync}$ assigned to the sync channel out of available Walsh codes to orthogonally spread the sync channel signal. A multiplier 125 multiplies the sync channel signal output from the multiplier 124 by the PN sequence to spread the sync channel signal.

With regard to a paging channel generator 130, an encoder 131 encodes an input paging channel signal. An R=½, K=9 convolutional encoder can be used for the encoder 131. A repeater 132 repeats the symbols output from the encoder 131 N times (N=1 or 2). An interleaver 133 interleaves the symbols output from the repeater 132 in order to prevent burst errors. A block interleaver is typically used for the interleaver 133. A long code generator 141 generates a long code which is the user identification code. A decimator 142 decimates the long code so as to match the rate of the long code to the rate of the symbol output from the interleaver 133. An exclusive OR gate 143 XORs the encoded paging signal output from the interleaver 133 and the long code output from the decimator 142 to scramble the paging signal. A multiplier 134 multiplies the scrambled paging signal output from the exclusive OR gate 143 by an orthogonal code $W_p$ assigned to the paging channel in order to maintain orthogonality with other channel signal. A multiplier 135 multiplies the paging channel signal output from the multiplier 134 by the PN sequence to spread the paging channel signal.

As stated above, the orthogonally spread transmission signals of the respective channels are multiplied by the PN sequence to be spread, and up-converted into an RF (Radio Frequency) signal to be transmitted. In the IS-95 standard, spreading is performed using two different PN sequences for the I and Q arms. The PN sequences used herein have a period of 32,768.

In the forward link structure of FIG. 1, the pilot channel does not carry data and spreads a signal of all "1"s with a PN sequence of period 32,768 to transmit. In a system having a chip rate of 1.2288 Mcps (chips per second), one PN sequence period corresponds to 26.7 msec (80/3 msec). Upon power-on, the receiver in a mobile station acquires the pilot channel signal on the forward link shown in FIG. 1 in order to acquire synchronization with a base station.

FIG. 2 illustrates a receiver in a mobile station, which receives forward link channel signals from a base station.

Referring to FIG. 2, an RF receiver 212 receives an RF signal transmitted from a base station and then down-converts the received RF signal into a baseband signal. An analog-to-digital (A/D) converter 214 converts the baseband signal output from the RF receiver 212 to digital data. A searcher 222 acquires the pilot channel signal out of the forward channel signals in order to synchronize the mobile station with the base station. N fingers 231–23N despread corresponding forward channel signals to detect a correlation value among the channel signals. A combiner 226 combines the output signals of the respective fingers 231–23N.

As illustrated in FIG. 2, a receiver of a mobile station is comprised of the searcher 222, the N fingers 231–23N and the combiner 226. Acquisition of the pilot signal is performed by the searcher 222.

FIG. 3 is a timing diagram of forward channel signals that a base station transmits, in which the frame offset of a traffic channel is assumed to be 0.

Referring to FIG. 3, reference numeral 311 represents a 80 ms boundary of a base station, which is determined from a two second boundary of the Global Positioning System (GPS). Reference numeral 313 represents the pilot offset of the base station. Reference numeral 315 represents the boundaries of three spreading sequence periods within 80 ms, from which it is clear that one spreading sequence period is 26.7 ms (=80/3 ms). Herein, the spreading sequence is assumed to be a PN sequence. Each spreading sequence period is synchronized with a 26.7 ms frame boundary where a sync channel is interleaved. Here, the 80 ms frame will be referred to as the second frame and the 26.7 ms frame the first frame.

Reference numeral 317 represents an 80 ms frame boundary of the sync channel, and the 80 ms frame structure of the sync channel is illustrated in FIG. 4. For the sync channel signal, the 80 ms frame represented by reference numeral 412 is comprised of three 26.7 ms frames each including a sync bit SOM (Start of Message) set according to a pilot sequence period. For example, in the 80 ms period, the sync bit SOM for the first 26.7 ms frame period is determined as "1" (or "0"), and the sync bits SOMs for the following 26.7 ms frames are determined as "0" (or "1"). Therefore, detecting a sync bit SOM of "1" (or "0") in the 80 ms period means detection of an 80 ms sync channel signal.

Reference numeral 319 represents the frame boundaries of the paging channel and the traffic channel. For the traffic channel, the 80 ms frame is comprised of four 20 ms frames. Therefore, it is noted from FIG. 3 that in the 80 ms period, the sync channel is comprised of three 26.7 ms frames and the traffic channel is comprised of four 20 ms frames.

Referring to FIGS. 3 and 4, a description will be made regarding the synchronizing procedure performed between a base station and a mobile station. The standard timing of the base station is derived from the 80 ms boundary 311 which is determined from the two second boundary of the GPS. The pilot signal of the base station is offset by the pilot offset 313 in the 80 ms boundary obtained from the GPS. This is to uniquely identify base stations using the same sequence by setting the pilot offset differently for each of the respective base stations. The pilot channel signals for the forward link are repeated at a period of 26.7 ms as represented by reference numeral 315. A sync channel signal is interleaved/deinterleaved at periods of 26.7 ms as represented by reference numeral 414, and this boundary is synchronized with one pilot sequence period. Therefore, upon acquiring a pilot channel signal, a mobile station in an IS-95 mobile communication system can accurately acquire the interleaving/deinterleaving frame sync for a sync channel as shown in FIG. 4.

Thereafter, the mobile station should acquire the 80 ms boundary 317 of the sync channel. The sync channel for the forward link transmits the sync bit SOM every 26.7 ms as represented by reference numeral 414. The SOM bit is set to "1" in the first 26.7 ms frame and to "0" in the following two 26.7 ms frames. The receiver of the mobile station becomes synchronized with the 80 ms boundary utilizing the SOM bits of the sync channel. The receiver of the mobile station synchronizes with the pilot channel in order to be synchronized with the base station, whereby the receiver demodulates a signal on the sync channel every 26.7 ms, and determines a 26.7 ms frame with the demodulated SOM bit of "1" as the start of an 80 ms boundary.

The forward link structure of FIG. 1 and the synchronization procedure of FIGS. 3 and 4 are applicable to an IS-95 mobile communication system having a chip rate of 1.2288 Mcps. However, for high-speed data transmission and effective system design, an IMT-2000 system will increase the chip rate to use the wider bandwidth.

It is expected that the IMT-2000 mobile communication system will use a chip rate which is higher by 3, 6 and 12 times the chip rate of the existing IS-95 system. Herein, it is assumed that the chip rate of the IMT-2000 system increases to 3.6864 Mcps, three times the chip rate of the IS-95 system. In this case, if a PN sequence having the same period as that of a spreading sequence for the existing IS-95 mobile communication system is used, one PN sequence period decreases by ⅓ times to be 80/9 ms. In that case, the procedure for acquiring the 80 ms sync for the sync channel becomes complicated. In particular, even though the mobile station initially acquires a pilot signal, since it does not know the boundary of the 26.7 ms frame, it is not possible to use the sync acquiring procedure used in the 1.2288 Mcps narrow band system.

One method for solving this problem is to use a spreading sequence having a period which is as long as the increase in the chip rate. For example, when the chip rate is increased by three times, the period of the spreading sequence is also increased by three times so as to maintain one spreading sequence period to be 26.7 ms. However, the increase in length of the PN sequence by three times causes an increase in initial acquisition time of the mobile station.

Therefore, when the chip rate increases beyond that of the existing IS-95 system, a new initial synchronization method will be required.

SUMMARY OF THE INVENTION

It is an object of the present invention to provide a device and method for rapidly performing initial acquisition and frame synchronization of a received signal in a spread spectrum communication system.

It is another object of the present invention to provide a device and method for rapidly performing initial acquisition and frame synchronization of a received signal using a spreading sequence having the same frame boundary during spreading in a receiver for a CDMA communication system.

In accordance with an object of the present invention, there is provided a device for transmitting a channel signal for a base station in a CDMA communication system. The signal includes a first chip rate that is multiple times a second chip rate, a first frame with a duration of a spreading sequence having the second chip rate, and a second frame whose frame length is multiple times the length of the first frame. The device enables the receiver to synchronize the spreading sequence having the first chip rate with the first frame. The device comprises a spreading sequence generator for generating a spreading sequence having the first chip rate; a sync pattern generator for generating a sync pattern for distinguishing the first frame by varying the pattern of the spreading sequence having the first chip rate at a boundary of the first frame; and a spreader for generating a sync spreading code using the spreading code having the first chip rate and the sync pattern, and spreading a transmission signal with the sync spreading code.

In addition, there is provided a device for receiving the channel signal in a mobile station in a CDMA communication system. The received signal includes a first chip rate that is multiple times the second chip rate, the first frame having the second chip rate and the second frame whose frame length is multiple times the length of the first frame. The device receives the spread signal using a spreading code having the first chip rate, which alternates its sign from one first frame duration to the next. The device comprises a despreader for despreading the spread signal with a spreading sequence having the first chip rate; an orthogonal demodulator for orthogonally demodulating a pilot channel signal from the despread signal; a decider for examining the pilot channel signal to determine whether the pilot channel signal has varied in sign, and, upon detection of variation in sign of the pilot channel signal, deciding a boundary of the first frame; and a sync channel receiver for determining a boundary of the first frame for the sync channel according to the output of the decider and detecting sync bits at predetermined positions in the first frame to acquire synchronization with the second frame.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

A CDMA communication system is described that uses a spreading sequence having the same length as the spreading sequence used in an IS-95 system in order to rapidly acquire synchronization, even though the chip rate increases.

To this end, a base station according to a first embodiment of the present invention multiplies a spreading sequence by a sync pattern. Here, the spreading sequence has the same period as that of a spreading sequence used in the IS-95 communication system, and has an increased chip rate. The sync pattern allows the spreading sequences with the increased chip rate to maintain the same value for a 26.7 ms duration and maintain a different value for the next 26.7 ms durations, i.e., to maintain the same value for the 26.7 ms duration and maintain a different value at the boundary of the 26.7 ms duration. A mobile station then initially calculates a correlation value with a spreading sequence to perform initial acquisition, despreads an N-chip duration around the boundary of one spreading sequence period and detects the sync pattern which varies at the 26.7 ms boundary to acquire frame sync.

According to a second embodiment of the present invention, a base station multiplies a spreading sequence by a sync pattern. Here, the spreading sequence has the same period as that of a spreading sequence used in the IS-95 communication system, and has an increased chip rate. The sync pattern allows the spreading sequences with the increased chip rate to maintain the same value for a 80 ms duration and maintain a different value for the next 80 ms durations, i.e., to maintain the same value for the 80 ms duration and maintain a different value at the boundary of the 80 ms duration. A mobile station then initially calculates a correlation value with a spreading sequence having the increased chip rate to perform initial acquisition, despreads an N-chip duration around a boundary of one spreading sequence period and detects the sync pattern which varies at the 80 ms boundary to acquire frame sync.

Figure 1:
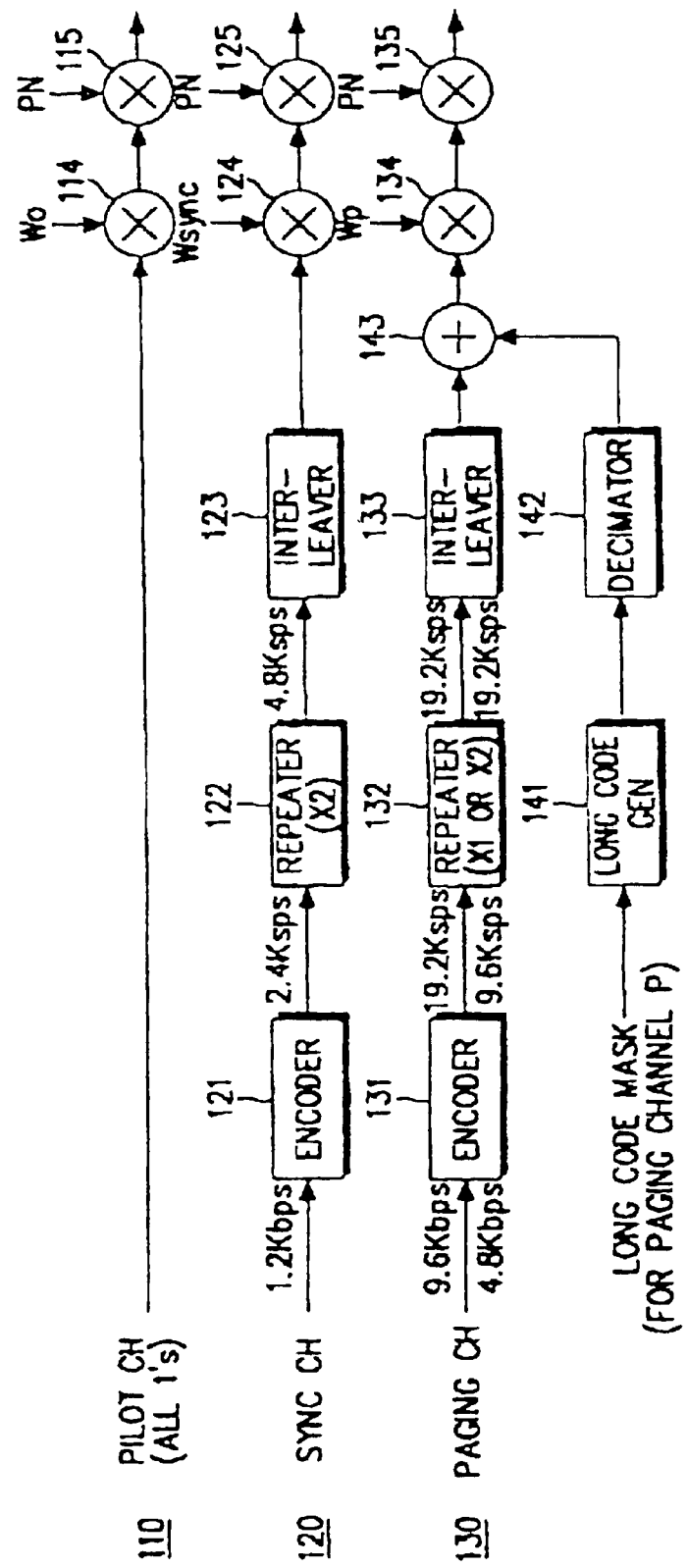
FIG. 1 is a diagram illustrating a forward link structure of a conventional CDMA communication system.
Figure 2:
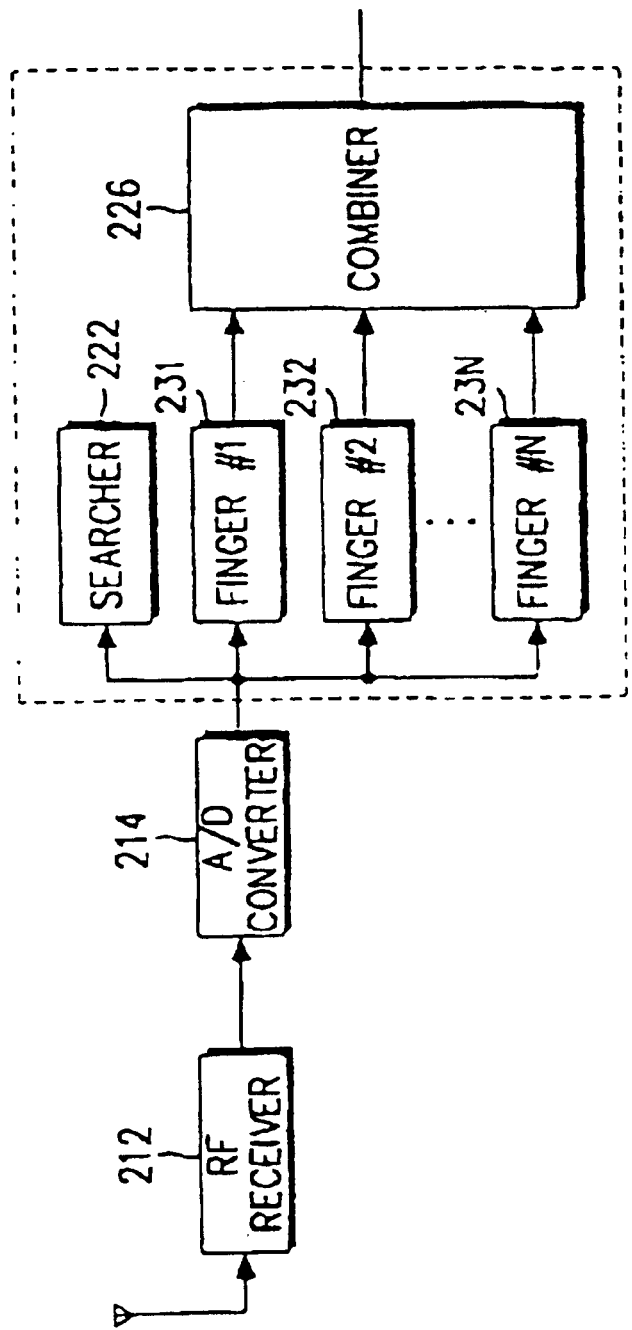
FIG. 2 is a receiver for a conventional CDMA communication system.
Figure 3:
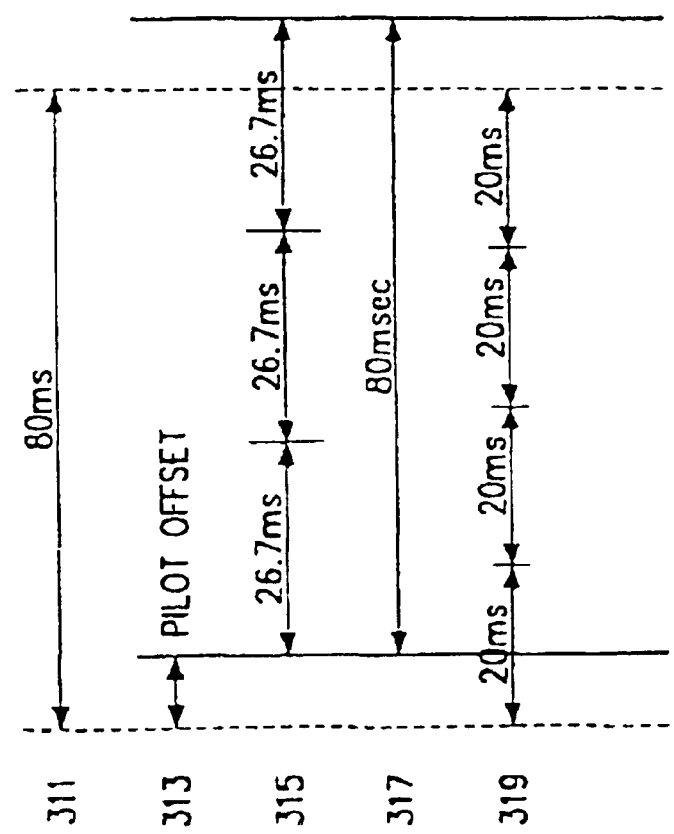
FIG. 3 is a timing diagram of a base station for a conventional CDMA communication system.
Figure 4:
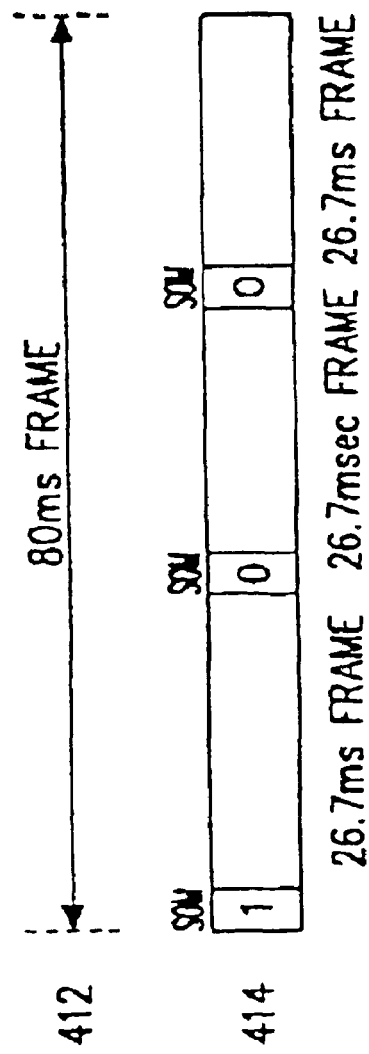
FIG. 4 is a diagram illustrating SOM bits on a sync channel.
Figure 5A:
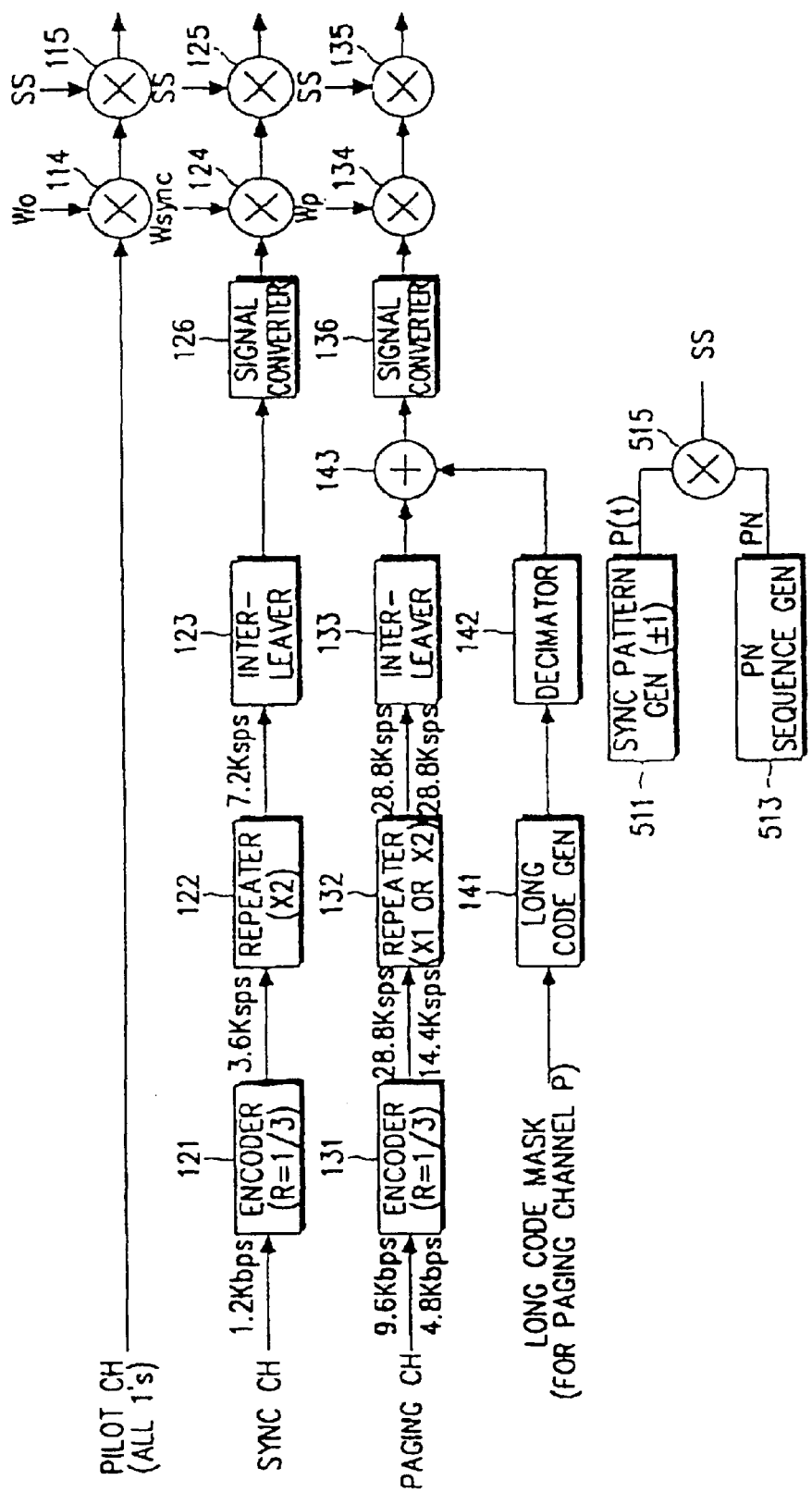
FIGS. 5A and 5B are diagrams illustrating a pilot channel structure and a spreading sequence structure respectively, according to an embodiment of the present invention.
Figure 5B:
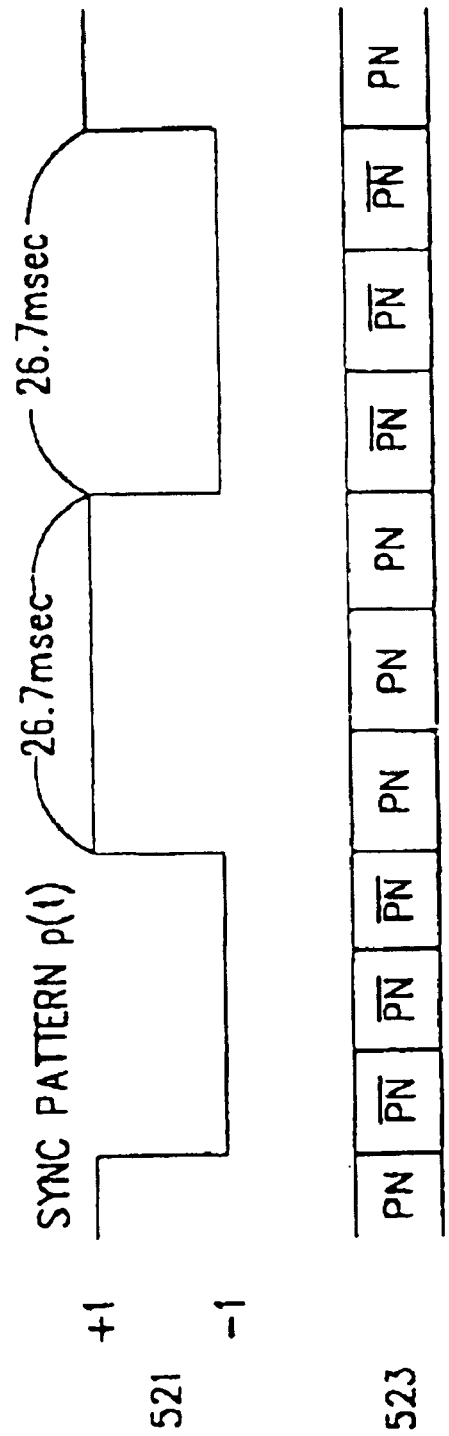

The pilot channel transmitted from a base station over a forward link is constructed as shown in FIG. 5A, and the signal on the pilot channel is inverted at 26.7 ms frame periods as shown in FIG. 5B.

A description of an embodiment will be made using an example in which the chip rate is 3.6864 Mcps. Therefore, in the embodiment, a PN sequence period is $2^{15}$ (=32,768) chips. It is assumed in the embodiment that one PN sequence period is 8.89 ms (80/9 ms) which is ⅓ the existing PN sequence period. This means that the bandwidth of the embodiment is 3 times the bandwidth of the existing IS-95 mobile communication system.

A spreading sequence according to an embodiment of the present invention is generated by multiplying a PN sequence of a short period by a sync pattern for frame synchronization, which sync pattern has a time period which is multiple times the short period of the PN sequence. The PN sequence having a period 26.7 ms is referred to as the first chip rate spreading sequence, and the PN sequence having a period 8.89 ms is the second chip rate spreading sequence. The sync pattern maintains the same value for one period (=8.89 ms) of the second chip rate spreading sequence, but may be varied at a boundary of the PN sequence. In the embodiment, the sync pattern to be multiplied by a spreading sequence having the first chip rate maintains the same value for 3 PN sequence periods (=26.7 ms) having the first chip rate. However, the sync pattern value is inverted from "+1" to "−1" or from "−1" to "+1" at a 26.7 ms frame boundary where the sync channel is interleaved. Such a spreading sequence of the first chip rate is used for the pilot channel, sync channel, paging channel and traffic channel.

In the embodiment, the 26.7 ms frame is referred to as a first period frame and the 80 ms frame a second period frame.

FIG. 5A illustrates abase station transmitter according to an embodiment of the present invention. Referring to FIG. 5A, a description will be made regarding the structures of a pilot channel generator, a sync channel generator and a paging channel generator.

With regard to a pilot channel generator, a signal on the pilot channel has all "1"s (ones) or all "0"s (zeros). A multiplier 114 multiplies the pilot signal by an orthogonal code $W_0$ to orthogonally spread the pilot signal.

With regard to a sync channel generator, an encoder 121 encodes 1.2 Kbps sync channel data input. A R=⅓, K=9 convolutional encoder can be used for the encoder 121. Therefore, the symbol rate of the coded data output from the encoder 121 becomes 3.6 Ksps (symbols per second). A repeater 122 repeats the sync symbols output from the encoder 121 N times (N=2). In this case, the symbol rate of the data output from the repeater 122 becomes 7.2 Ksps. An interleaver 123 interleaves the symbols output from the repeater 122 in order to prevent burst errors. A block interleaver can be used for the interleaver 123. A signal converter (or signal mapper) 126 converts symbol data of logic "0" and "1" output from the interleaver 123 to the levels "+1" and "−1", respectively, and then demultiplexes the level converted data to the I and Q arms. A multiplier 124 multiplies the sync channel signals for the I and Q arms output from the signal converter 126 by a specific orthogonal code $W_{sync}$ assigned to the sync channel to orthogonally spread the sync channel signals. The sync channel outputs the positional information, standard time information and long code information of the base station, and also outputs information for system synchronization between the base station and a mobile station. As stated above, the sync channel generator encodes an input sync channel signal, and multiplies the encoded sync channel signal by a specific Walsh code $W_{sync}$ assigned to the sync channel out of available Walsh codes to orthogonally spread the sync channel signal.

With regard to a paging channel generator, an encoder 131 encodes a 9.6 or 4.8Kbps paging channel signal input. AR=⅓, K=9 convolutional encoder can be used for the encoder 131. Therefore, the rate of the symbols output from the encoder 131 becomes 28.8 Ksps or 14.4 Ksps. A repeater 132 repeats the symbols output from the encoder 131 N times (N=1 or 2). Specifically, the repeater 132 does not repeat the symbols for the symbol rate 28.8 Ksps, but does repeat the symbols one time for the symbol rate 14.4 Ksps so that either way the repeater outputs at the symbol rate 28.8 Ksps. An interleaver 133 interleaves the symbols output from the repeater 132 in order to prevent burst errors. A block interleaver is typically used for the interleaver 133. A long code generator 141 generates a long code which is a user identification code. A decimator 142 decimates the long code so as to match the rate of the long code to the rate of the symbols output from the interleaver 133. An exclusive OR gate 143 XORs the encoded paging signal output from the interleaver 133 and the long code output from the decimator 142 to scramble the paging signal. A signal converter (or signal mapper) 136 converts the symbol data of logic "0" and "1" output from the exclusive OR gate 143 to the levels "+1" and "−1", respectively, and then demultiplexes the level converted data to the I and Q arms. A multiplier 134 multiplies the scrambled paging signals for the I and Q arms, output from the signal converter 136, by an orthogonal code $W_p$ assigned to the paging channel to orthogonally spread the paging signals.

The orthogonally spread transmission signals of the respective channels are multiplied by a sync spreading code SS to be spread, and up-converted into an RF signal to be transmitted.

A description will be made regarding the operation of generating the sync spreading code SS. A sync pattern generator 511 generates a sync pattern P(t) which is inverted at periods of the first frame period 26.7 ms from "+1" to "−1" or from "−1" to "+1" as represented by reference numeral 521 of FIG. 5B. A PN sequence generator 513 generates a PN sequence having the first chip rate for spreading spectrum. Here, it is assumed that the PN sequence includes different PN sequences for the I and Q arms, and the chip number of the PN sequences is 32,768 (=$2^{15}$). A multiplier 515 multiplies the sync pattern P(t) output from the sync pattern generator 511 by the PN sequence output from the PN sequence generator 513 to generate the sync spreading code SS. The sync spreading code SS is applied in common to multipliers 115, 125 and 135. Here, the sync spreading code SS is a spreading code of the first chip rate, obtained by multiplying the sync pattern by the PN sequence.

The multiplier 115 multiplies the pilot channel signal output from the multiplier 114 by the sync spreading code SS to spread the pilot channel signal. The multiplier 125 multiplies the sync channel signal output from the multiplier 124 by the sync spreading code SS to spread the sync channel signal. The multiplier 135 multiplies the paging channel signal output from the multiplier 134 by the sync spreading code SS to spread the paging channel signal.

Now, a description will be given regarding the operation of the pilot channel generator with reference to FIGS. 5A and 5B. The pilot channel signal comprised of all "1"s is multiplied by the orthogonal code $W_0$ for the pilot channel in the multiplier 114 to be orthogonally spread. The spread pilot channel signal is multiplied again by the sync spreading code SS in the multiplier 115 to be transmitted after spreading. The sync spreading code SS is generated from the multiplier 515 which multiplies the sync pattern P(t) represented by reference numeral 521 by the PN sequence with the first chip rate of a period 32768. As represented by reference numeral 521, the sync pattern P(t) is inverted at 26.7 ms periods at the frame boundary where the data on the sync channel is interleaved. Further, the spread pilot channel signal multiplied by the sync spreading code SS in the multiplier 115 has an extended bandwidth so that 3 spreading sequences of the first chip rate can be transmitted at a frame duration of the first period 26.7 ms, as represented by reference numeral 523, and the sync spreading code SS is inverted at the first frame period 26.7 ms.

Upon power-on, the receiver of a mobile station receives the pilot channel signal transmitted from a base station as represented by reference numeral 523 and performs acquisition of the PN sequence having the first chip rate. The orthogonal code used in FIG. 5B is assumed to be a Walsh code of all "0"s. In the same manner as the conventional acquisition method, the PN sequence of the first chip rate is acquired by calculating a correlation value between the received signal and a locally generated PN sequence to detect the position having the higher correlation value. In the existing IS-95 mobile communication system, since one PN sequence period coincides with a 26.7 ms frame where a sync channel is interleaved, the sync channel is demodulated as it is, to acquire sync of the second frame which is a 80 ms sync frame, using the SOM bits. However, when the chip rate is three times higher, if the PN sequence having the second chip rate is used as in the IS-95 system, one period of the PN sequence having the first chip rate is shorter than 26.7 ms which is a length of a frame where the sync channel is interleaved.

Therefore, in this embodiment, after PN sequence acquisition, it is necessary to align the 26.7 ms boundary of the sync channel frame having the second chip rate, where data on the sync channel is interleaved, prior to demodulating the sync channel. To this end, a feature of the sync pattern P(t) is utilized. In the embodiment, the sync pattern is generated to be inverted in sync with a frame boundary having the first period 26.7 ms as shown in FIGS. 5A and 5B.

Figure 6:
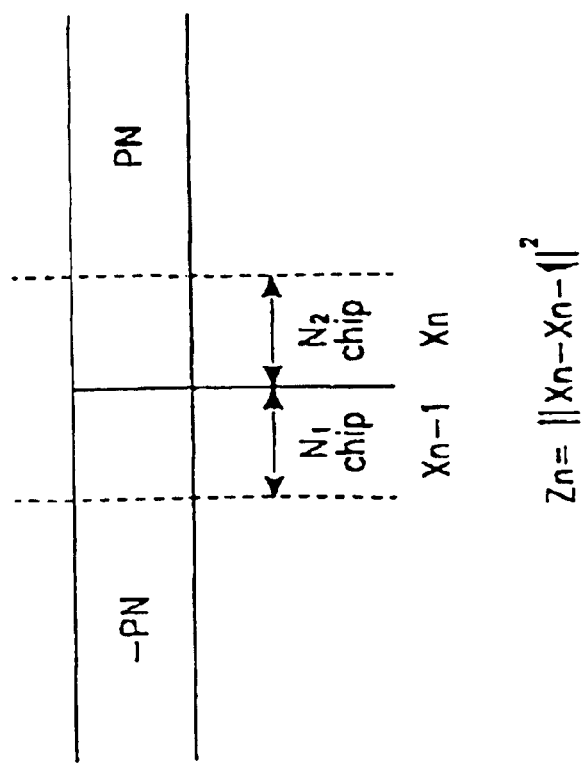
FIG. 6 is a diagram illustrating how a receiver calculates the decision variable according to an embodiment of the present invention.

FIG. 6 illustrates a pilot channel at a position where the sync pattern is inverted. In FIG. 6, an orthogonal code used for spreading is assumed to be a Walsh code of all "0"s.

Referring to FIG. 6, the sync pattern P(t) multiplied by a spreading sequence of the first chip rate is inverted from "−1" to "+1". When the spreading sequence of the first chip rate is PN, the pilot channel becomes −PN prior to inversion and PN after inversion. Here, when the result of despreading an $N_1$ chip before inversion of the PN is $X_{n-1}$ and the result of despreading an $N_2$ chip after inversion of the PN is $X_n$, a decision variable $Z_n$ is calculated by $$Z_n = |X_n - X_{n-1}|^2 \tag{1}$$

The decision variable $Z_n$ has a higher value at the 26.7 ms boundary where the sync channel is interleaved and has a value approximate to zero at other locations. By using the same value for the despreading durations $N_1$ and $N_2$, it is possible to detect a frame boundary utilizing a more orthogonal feature.

There are several methods for detecting the 26.7 ms frame based on the decision variable $Z_n$. In one method, the decision variable $Z_n$ is calculated every 26.7 ms, one period of the spreading sequence; when exceeding a threshold, the calculated decision variable is determined as a boundary of a frame where the sync channel is interleaved. In another method, the decision variable $Z_n$ is calculated every 8.89 ms; the decision variables for all hypotheses are compared to determine a position having the highest value as a frame boundary where the sync channel is interleaved.

After determining the 26.7 ms frame boundary for the sync channel, the receiver of the mobile station interleaves and decodes the signal on the sync channel at periods of the first frame 26.7 ms, to detect a SOM bit of the sync channel. The timing of the receiver is aligned with the 80 ms boundary by detecting the 80 ms boundary of the sync channel from the SOM bit of the sync channel. This procedure is identical to that in the existing IS-95 system.

Figure 7:
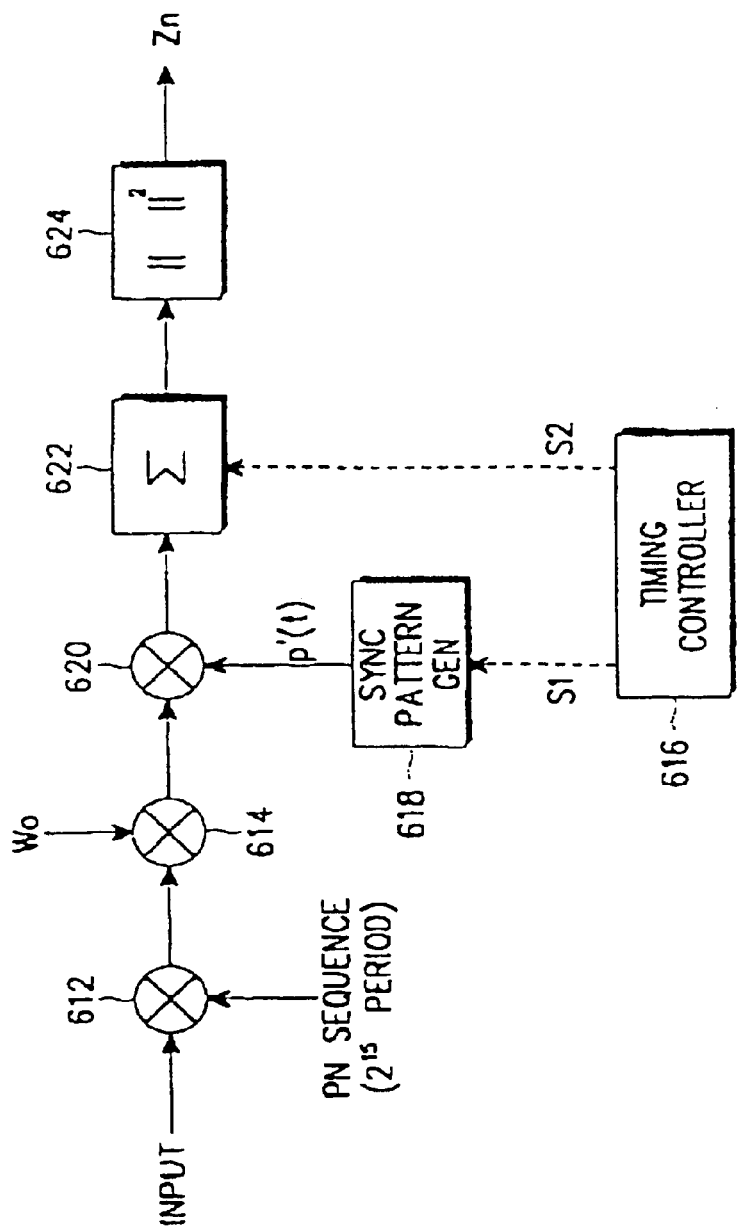
FIG. 7 is a diagram illustrating a receiver for calculating that calculates a decision variable using a pilot signal in a mobile station according to an embodiment of the present invention.

FIG. 7 illustrates a receiver for a mobile station according to an embodiment of the present invention, which acquires a spreading sequence having the first chip rate and then detects the boundary of a first frame on the sync channel.

Referring to FIG. 7, a multiplier 612 multiplies the received signal by a spreading sequence of the first chip rate to despread the received signal. A multiplier 614 multiplies the PN despread signal output from the multiplier 612 by an orthogonal code $W_0$ for a pilot channel to orthogonally demodulate the PN despread signal. Therefore, a signal output from the multiplier 614 is a PN despread, orthogonally demodulated pilot channel signal.

Figure 8:
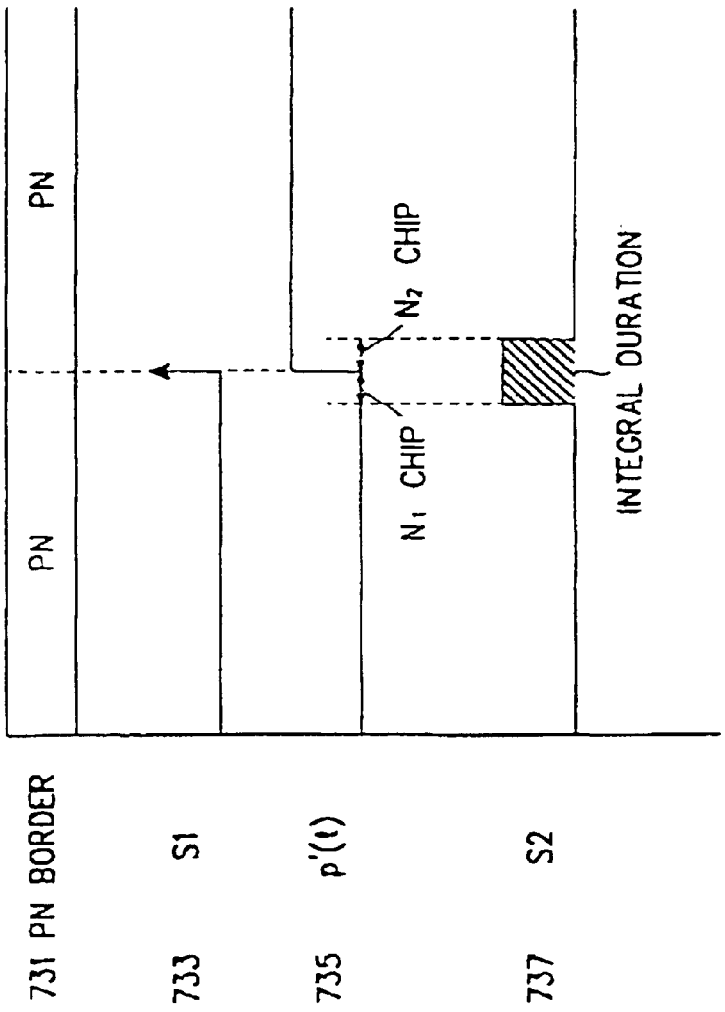
FIG. 8 is the timing diagram of the timing controller in the mobile station receiver of FIG. 7.

A timing controller 616 generates a signal S1 representing the 26.7 ms (which is three periods of the spreading sequence at the first chip rate having a 8.89 ms frame period) boundary and a signal S2 representing the despreading duration lasting from the beginning of the $N_1$ chip to the end of the $N_2$ chip. FIG. 8 is the timing diagram of a control signal output from the timing controller 616. In FIG. 8, reference numeral 731 represents a boundary of a sync channel having a 26.7 ms frame period, and the signal S1 (represented by reference numeral 733) is a PN boundary signal generated at the boundary of the spreading sequence at periods of the 26.7 ms frame. Reference numeral 735 represents the sync pattern P'(t) generated from a sync pattern generator 618 in response to the signal S1, and reference numeral 737 represents the signal S2 which is activated from the beginning of the $N_1$ chip to the end of the $N_2$ chip centering about the signal S1, at a 8.89 ms frame boundary of a spreading sequence having the first chip rate. The activated duration of the signal S2 becomes the time period over which the despread pilot signal is integrated.

As stated above, the sync pattern generator 618 generates the sync pattern P'(t) in response to the S1 signal generated from the timing controller 616. A multiplier 620 multiplies the pilot channel signal output from the multiplier 614 by the sync pattern generated from the sync pattern generator 618. An accumulator 622 integrates the signal output from the multiplier 620 in response to the S2 signal generated from the timing controller 616. A squarer 624 squares the integrated signal output from the accumulator 622 to convert the integrated signal to an energy signal.

Referring to FIGS. 7 and 8, the receiver despreads the received signal with a first spreading sequence and a Walsh code for the pilot channel and then multiplies the despread signal by a sync pattern P'(t) output from the sync pattern generator 618, which is inverted from "+1" to "−1" or from "−1" to "+1" at each period of the first spreading sequence despread signal multiplied by the sync pattern P'(t) is accumulated by the accumulator 622 for an integral duration N, where $N=N_1+N_2$. The accumulated signal is squared by the squarer 624 to calculate an energy value which equals the decision variable $Z_n$. The timing controller 616 generates the S1 signal representing a boundary of a 26.7 ms frame duration and the S2 signal representing a despreading duration lasting from the beginning of the $N_1$ chip to the end of the $N_2$ chip. The S2 signal representing the despreading duration controls an accumulating duration of the accumulator 622. Further, the S1 signal representing one period of the first spreading sequence designates a position where the sync pattern P'(t) output from the sync pattern generator 618 is to be inverted.

Now, a description will be made regarding the frame boundary search method according to a second embodiment of the present invention.

As stated above, the frame boundary search method according to the first embodiment of the present invention is a type of method in which data is transmitted using a spreading sequence having a frame period shorter in length than a 26.7 ms frame and then, a boundary of the frame is detected using a sync pattern. In the first embodiment, the frame boundary is detected while maintaining the boundary of the 26.7 ms frame where the sync channel is interleaved. However, in the second embodiment, the frame where the sync channel is interleaved is extended to 80 ms in length and the sync acquisition of a 80 ms frame by means of the SOM bit is replaced with a sync pattern. Extending the interleaving length improves performance by decreasing the frequent demodulation performed every 26.7 ms in the first embodiment.

Figure 9:
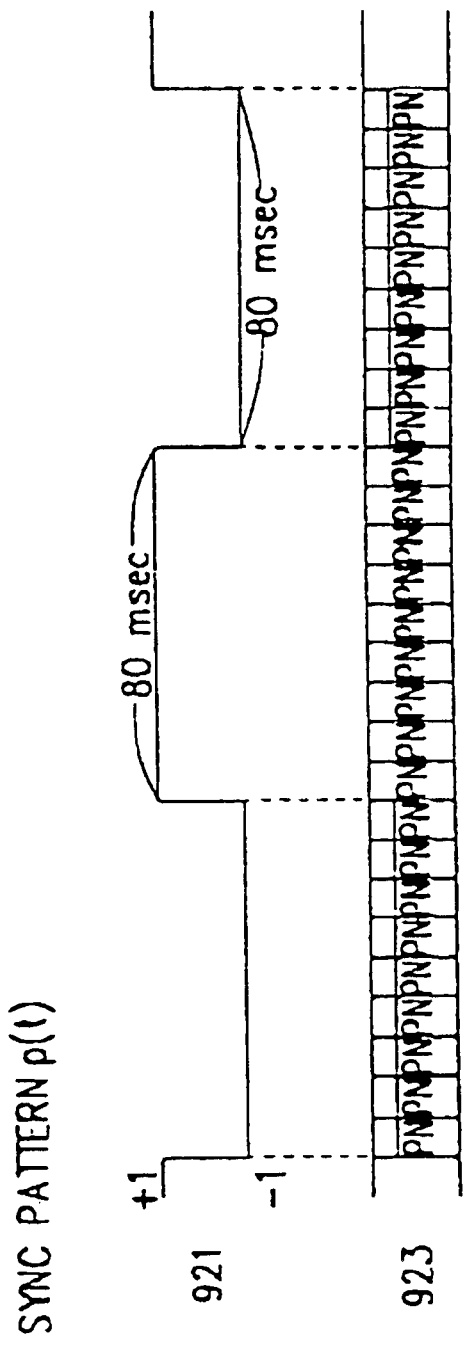
FIG. 9 is a diagram illustrating a format of a signal that a base station transmits when the interleaving size of a sync channel is extended, according to another embodiment of the present invention.

FIG. 9 illustrates a format of a pilot channel signal according to the second embodiment of the present invention. A base station transmitter has the same structure as that of FIG. 5A. However, in the second embodiment, a sync pattern P(t) output from the sync pattern generator 511 is inverted at a second frame period of 80 ms as represented by reference numeral 921, and the PN sequence generated from the PN sequence generator 513 has a frame period of 8.89 ms. The second embodiment is different from the first embodiment in that sync acquisition for the 80 ms frame can be performed without using the SOM bit. Further, in the second embodiment, interleaving for the sync channel can be performed every 80 ms. Therefore, the sync pattern P(t) output from the sync pattern generator 511 is inverted every 80 ms as represented by reference numeral 921.

Referring to FIGS. 5A and 9, a description will be made regarding the operation of the second embodiment of the present invention. Upon power-on, the receiver acquires the spreading sequence of the first chip rate in order to acquire synchronization with the 8.89 ms periods. Thereafter, the receiver acquires 80 ms sync utilizing the sync pattern. At this point, the receiver operates in the same manner as in the first embodiment. However, in the second embodiment, since nine spreading sequences of period 32,768 can be transmitted for 80 ms as represented by reference numeral 923, the highest decision variable $Z_n$ out of nine decision variables must be detected. The receiver can declare sync acquisition when the decision variable $Z_n$ exceeds a threshold, and declare a position having the highest decision variable as the 80 ms frame boundary by comparing the available nine decision variables. To this end, the receiver has the same structure as that shown in FIG. 7, of the first embodiment. However, in the second embodiment, since it is possible to acquire the 80 ms boundary using the sync pattern, the timing controller 616 generates the S1 signal at 80 ms periods. In this case, it is possible to avoid using the SOM bit from the conventional sync.

As described above, in a spread spectrum communication system, a base station multiplies a spreading sequence for the pilot channel by a pattern which maintains the same value for one short period of this sequence but can vary the value at the boundary of one short period, and transmits the multiplied value. A mobile station then initially calculates a correlation value with the spreading sequence of the short period to perform initial acquisition and despreads an N-chip duration around the boundary of one short spreading sequence period to detect the pattern in order to acquire synchronization of a data frame.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A device for receiving a channel signal for a mobile station in a code division multiple access (CDMA) communication system which includes a first chip rate being multiple times a second chip rate, a first frame with a duration of a spreading sequence having the second chip rate and a second frame whose frame length is multiple times a length of the first frame, in order to receive a spread signal using a spreading code having the first chip rate, which inverts its sign at every other first frame duration, the device comprising:
    a despreader for despreading the spread signal with a spreading sequence having the first chip rate;
    an orthogonal demodulator for orthogonally demodulating a pilot channel signal from the despread signal;
    a decider for examining the pilot channel signal to determine whether the pilot channel signal has varied in sign, and upon detection of variation in sign of the pilot channel signal, deciding a boundary of the first frame; and
    a sync channel receiver for determining a boundary of the first frame for the sync channel according to an output of the decider and detecting sync bits for predetermined positions of the first frame to acquire synchronization of the second frame.

2. The device as claimed in claim 1, wherein the first frame is a frame of the sync channel and the second frame is a frame for a paging channel.

3. The device as claimed in claim 1, wherein the sync pattern inverts its sign every other duration of the first frame.

4. The device as claimed in claim 3, wherein the channel receiving device is a sync channel receiving device.

5. The device as claimed in claim 3, wherein the decider comprises:
    a sync pattern generator for generating a sync pattern;
    a mixer for mixing the orthogonally demodulated spreading code with the sync pattern;
    a correlation value detector for detecting a correlation value by accumulating chips at a boundary for a boundary duration of the spreading code having the first chip rate; and
    a deciding device for deciding a boundary of the first frame by examining the detected correlation value.

6. The device as claimed in claim 5, wherein the first frame is 26.7 ms and the second frame is 80 ms.

7. The device as claimed in claim 5, wherein the first chip rate is three times a the chip rate of an IS-95 system.

8. A device for receiving a channel signal for a mobile station in a code division multiple access (CDMA) communication system which includes a first chip rate being multiple times a second chip rate, a first frame with a duration of a spreading sequence having the second chip rate and a second frame whose frame length is multiple times a length of the first frame, in order to receive a spread signal using a spreading code having the first chip rate, which inverts its sign every other first frame duration, the device comprising:
    a despreader for despreading the spread signal with a spreading sequence having the first chip rate;
    an orthogonal demodulator for orthogonally demodulating a pilot channel signal from the despread signal;
    a decider for examining the pilot channel signal to determine whether the pilot channel signal has varied in sign, and upon detection of variation in sign of the pilot channel signal, deciding a boundary of the second frame; and
    a sync channel receiver for determining a boundary of the second frame for the sync channel according to an output of the decider to detect synchronization of the second frame.

9. A method for receiving a channel signal for a mobile station in a CDMA communication system which includes a first chip rate being multiple times a second chip rate, a first frame with a duration of a spreading sequence having the second chip rate and a second frame whose frame length is multiple times a length of the first frame, in order to receive a spread signal using a spreading code having the first chip rate, which inverts its sign every other first frame duration, the method comprising the steps of:
    despreading the spread signal with a spreading sequence having the first chip rate;
    orthogonally demodulating a pilot channel signal from the despread signal;
    examining the pilot channel signal to determine whether the pilot channel signal has varied in sign, and upon detection of variation in sign of the pilot channel signal, deciding a boundary of the first frame; and
    determining a boundary of the first frame for the sync channel according to the decision result and detecting sync bits for predetermined positions of the first frame to acquire sync of the second frame.

10. A method for receiving a channel signal for a mobile station in a CDMA communication system which includes a first chip rate being multiple times a second chip rate, a first frame with a duration of a spreading sequence having the second chip rate and a second frame whose frame length is multiple times a length of the first frame, in order to receive a spread signal using a spreading code having the first chip rate, which inverts its sign every other first frame duration, the method comprising the steps of:
    despreading the spread signal with a spreading sequence having the first chip rate;
    orthogonally demodulating a pilot channel signal from the despread signal;
    examining the pilot channel signal to determine whether the pilot channel signal has varied in sign, and upon detection of variation in sign of the pilot channel signal, deciding a boundary of the second frame; and
    determining a boundary of the second frame for the sync channel according to the decision result to detect sync of the second frame.

* * * * *